United States Patent [19]

Fernandez et al.

[11] Patent Number: 5,623,196

[45] Date of Patent: *Apr. 22, 1997

[54] APPARATUS AND METHOD OF SIMULATING HIGH BATTERY TEMPERATURE IN A RECHARGEABLE BATTERY

[75] Inventors: José M. Fernandez, Sunrise, Fla.; Vernon Meadows, Lilburn, Ga.; Venus D. Desai; Scott M. Garrett, both of Lawrenceville, Ga.; Dao N. Lam, Plantation, Fla.; James F. Kamke, Rancho Santa Marguerita, Calif.; Joseph Patino, Pembroke Pines, Fla.

[73] Assignee: Motorola, Inc., Schaumburg, Ill.

[ * ] Notice: The term of this patent shall not extend beyond the expiration date of Pat. No. 5,518,832.

[21] Appl. No.: 364,582

[22] Filed: Dec. 27, 1994

[51] Int. Cl.$^6$ .................................................. H01M 10/46
[52] U.S. Cl. .............................................. 320/30; 320/35
[58] Field of Search .............................. 320/21, 22, 23, 320/30, 35, 36, 39, 40

[56] References Cited

U.S. PATENT DOCUMENTS 4,992,722  2/1991  Maruyama et al. ............... 320/35 X
5,166,596  11/1992  Goedken ............................. 320/35

Primary Examiner—Edward H. Tso
Attorney, Agent, or Firm—Scott M. Garrett; Frank M. Scutch, III

[57] ABSTRACT

A device (111) for simulating a high battery temperature used in charging a rechargeable cell (101). The device takes advantage of a control signal generated by a voltage control circuit (103) used to disconnect a rechargeable cell (101) from a charging system (105) when a predetermined voltage is reached. The device (111) is generally used with cells having a lithium based chemistry and requiring a different charging regime then nickel chemistry cells. The device (111) is activated by the control signal from control circuit (103) which detects a predetermined voltage from rechargeable cell (101) enabling thermistor (113) to change its state. This change is detected by the charging system (105) which alters its mode of operation from a rapid charging rate to a slower charging rate. The device is retrofitable to existing rechargeable batteries allowing them to be charged using existing charging systems alien to the rechargeable battery.

28 Claims, 2 Drawing Sheets

APPARATUS AND METHOD OF SIMULATING HIGH BATTERY TEMPERATURE IN A RECHARGEABLE BATTERY

CROSS REFERENCE TO RELATED APPLICATIONS

This application is related to co-pending applications, Ser. No. 08/864,583, entitled "Apparatus for Simulating High Battery Temperature for Rechargeable Battery Systems", Ser. No. 08/357,891 entitled "Apparatus and Method of Providing an Initiation Voltage To A Rechargeable Battery System", Ser. No. 08/370,053 entitled "Apparatus For Simulating High Battery Temperature Used In Recharging Lithium Ion Cells" and assigned to Motorola, Inc.

TECHNICAL FIELD

This invention relates in general to battery recharging and more particularly to systems for rechargeable battery cells.

BACKGROUND

An increasing number of portable electronic products are available today which operate on a battery source within the device. These products include such things as cellular telephones, portable radios, pagers and voice recorders which are conveniently mobile and operate using rechargeable batteries. Many different battery chemistries have been used for many years which meet the need for recharging capability. Probably the most popular chemistries include nickel cadmium and nickel metal hydride. A relatively new chemistry, however, generally referred to as lithium ion, enables a cell to be recharged while offering many advantages over other types of rechargeable cells. These benefits primarily are directed to low weight and overall size with a high energy density. One unique factor to be considered when using a lithium ion cell is its charging scheme. A lithium ion cell is not charged in the same manner as cells utilizing a nickel chemistry.

Nickel-cadmium and nickel metal hydride cells are typically charged using a rapid charge by applying a constant current until a certain event occurs. This event may be coupled to the cell reaching a predetermined high voltage, decreasing to a predetermined low voltage or an increase in the cell's temperature. This is in contrast with the lithium ion cell which requires a two step charging process to achieve optimum performance. The first step of this process provides that the battery charger apply a constant current level while the cell's voltage remains below a predetermined threshold. Once the voltage increases to that threshold, the second step insures the battery charger is held at the threshold voltage allowing the current to decrease. Once the current decreases sufficiently to a desired level, the lithium ion cell is fully recharged.

This two step process presents a problem when considering charging lithium ion cells in a charger designed for nickel systems. Generally, nickel system chargers apply only a constant current which allows the voltage of the cells to rise unimpeded. The voltage may rise to any level provided the battery does not become too hot, i.e. increase to a undesired and dangerous level. Once the nickel system battery becomes hot, the charger detects this state and switches from the rapid high current charge to a value of approximately 5–10% that of the rapid current value. This lower current mode is generally referred to as a trickle current or trickle charge. Hence, the charging scheme offered by current nickel system chargers will not properly charge a lithium ion cell. Should a lithium ion cell be placed or forced in to the nickel system charger the result could be potentially dangerous since the lithium ion cell could quickly overheat. Therefore, the need exists for a battery charging circuit or system which can be retrofitted to the control circuitry of an existing lithium ion cell allowing the cell to safely use a nickel system charger.

DETAILED DESCRIPTION OF THE PREFERRED EMBODIMENT

Figure 1:
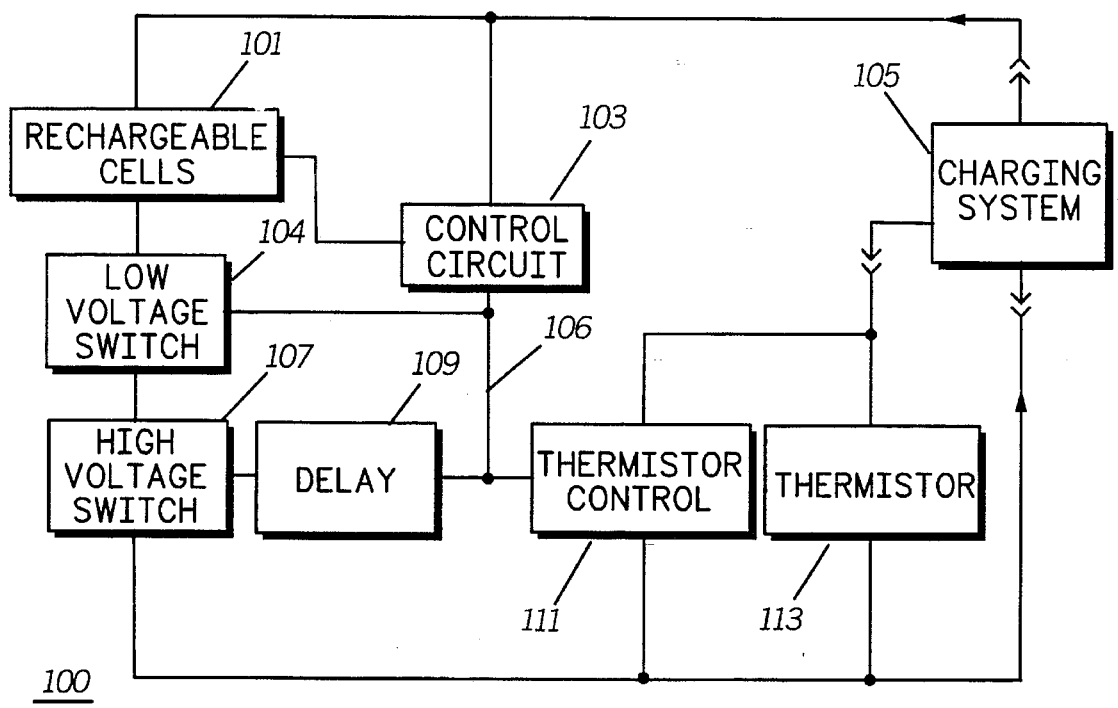
FIG. 1 is a block diagram showing operation of the high temperature simulator in accordance with the invention.

Referring now to FIG. 1, a block diagram depicting operation of a high temperature simulator for a rechargeable battery system which can simulate a high battery temperature condition is shown. The rechargeable battery may typically be one based on a lithium ion chemistry, lithium polymer chemistry or lead acid chemistry. The high temperature simulator allows a rechargeable battery to be charged using an alien charging system or charging network which generally has an incompatible charging scheme. An alien charging system may be one used with a nickel cadmium or nickel metal hydride type cells and has a first mode of operation and second mode of operation. The first mode of operation is generally a quick or fast mode while the second mode is a slower or trickle charge mode. These charging systems are generally referred to as nickel system battery chargers and are configured to charge nickel metal hydride or nickel cadmium cells.

As will be described in greater detail below, the preferred embodiment of the invention takes advantage of an inherent feature present with a nickel system battery charger. This feature insures that rapid charging of a rechargeable battery ceases when the appropriate control information is received from the battery. This control information is related to the battery's temperature during rapid charge. When the predetermined temperature is reached, the nickel system battery charger automatically switches to a low current or trickle charge state where the rechargeable battery can be charged more slowly.

A preferred embodiment of the invention shows battery 100 which includes a rechargeable cell 101. As indicated above, rechargeable cell 101 may be one or more cells with a lithium ion chemistry or the like. A control circuit 103 measures or observes the voltage of the rechargeable cell 101 while under charge by charging system 105. Charging system 105 is typically a charger used for nickel cadmium or nickel metal hydride cells. Control circuit 103 may be a comparator circuit or the like such as Motorola Integrated Circuit Model No. SC371013F/FER. Once control circuit 103 determines a predetermined voltage level or voltage potential has been reached, control circuit 103 produces a control signal on control line 106. The predetermined voltage is generally a selected voltage limit which is determined by the operational voltage of the rechargeable cell 101 and may depend on specific cell chemistry and/or associated charging algorithm.

The control line 106 is used to convey the control signal from control circuit 103 to each of low voltage switch 104, high voltage switch 107 and a temperature simulator device such as thermistor switch 111. Low voltage switch is used to disconnect rechargeable cell 101 in the event its voltage becomes too low, and thereby preventing damage to the cell. High voltage switch 107 and a delay circuit 109 are positioned in series with charging system 105 and are used to provide an open circuit after a desired delay period when a predetermined voltage is reached during charging. The delay period is used to allow charging system 105 to react to changes in current through temperature sensor or thermistor 113. Without the delay, charging system 105 may interpret the opening of high voltage switch 107 as rechargeable cell 101 being disconnected. Once this occurs, charging system 105 may turn itself off.

Thermistor switch 111 is attached to control circuit 103 and is also triggered by the control signal through control line 106 to provide a short circuit to thermistor 113. As is well known in the art, the resistive value or state of thermistor 113 changes in response to temperature changes of rechargeable cell 101. Thus, the current flowing through thermistor 113 changes in relation to the ambient environment in which thermistor 113 is exposed. This current flow is interpreted by the charging system 105 as a temperature value which it uses to determine when to switch charging modes. These modes are typically switched from a fast or rapid charge state, where charging rate is at a high level to a slower charge state where the charging rate is reduced. Thermistor switch 111 is attached to thermistor 113 and is controlled by ,control circuit 103, When actuated, thermistor switch 111 alters the current flow or state of thermistor 113. As indicated above, this increase in current through thermistor 113 is detected by charging system 105 as a high temperature condition. Thus, thermistor switch 111 acts as a control circuit to change the operational state of thermistor 113. Thermistor switch 111 then simulates a high temperature state of rechargeable cell 101. In response thereto, charging system 105 switches from a high rapid or substantially fast charge mode to a slow, low or trickle charge mode. Since rechargeable cell 101 was first allowed to charge to its predetermined voltage i.e. the first step of its charging scheme, the trickle charge mode now allows rechargeable cell 101 to be charged in accordance with the second step of its charging scheme. Once charging system 105 has switched to the lower current, the voltages of rechargeable cell 101 will drop slightly from their previous level due to internal resistance present within rechargeable cell 101. This lower level of current allows continued charging of the rechargeable cell while its voltage is below the threshold voltage level, until the cell becomes fully charged. However, charging using charging system 105 will generally take longer than if the ideal lithium ion charging regime were used.

Figure 2:
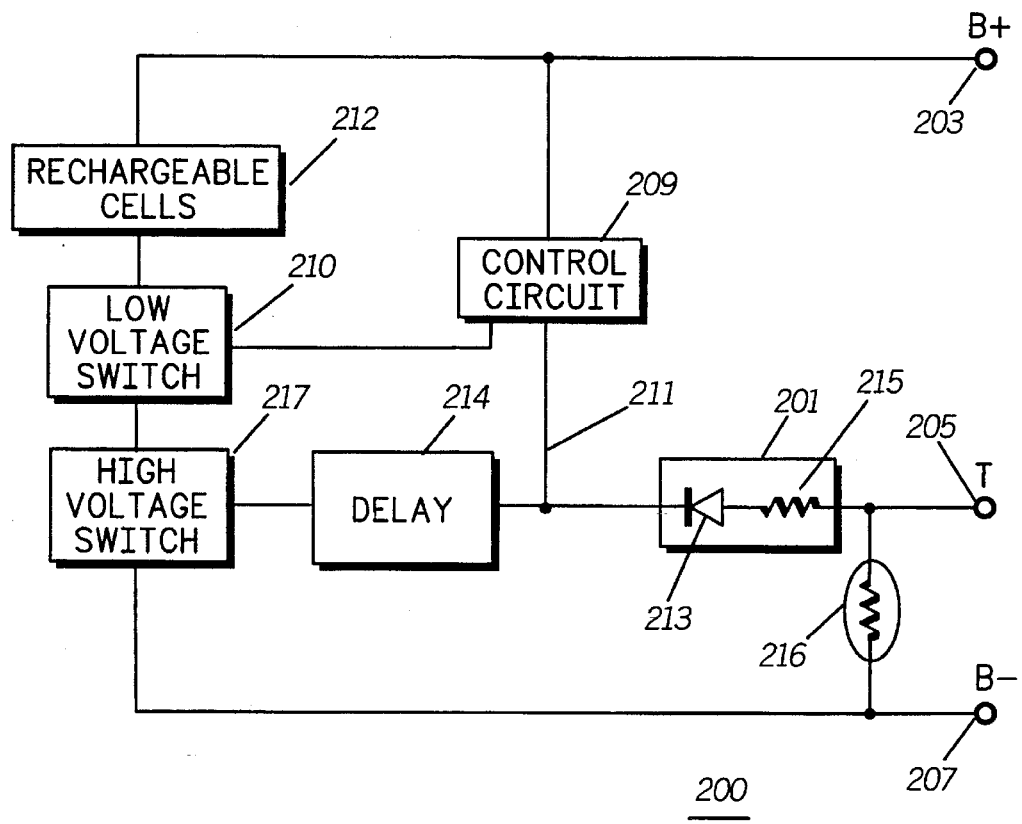
FIG. 2 is a partial schematic diagram in accordance with a preferred embodiment of the invention showing a high temperature simulator which is used when a high current source is available.

FIG. 2 illustrates a schematics representation of the high temperature simulator circuit 201 typically used in a rechargeable battery 200 where control circuit 209 can sink sufficient current to an isolated or virtual ground. As is seen in FIG. 2, rechargeable battery 200 typically includes a charging voltage node 203, a temperature node 205 and a virtual ground node 207. In operation, a charging voltage is connected to the charging voltage node 203 and virtual ground node 207. A battery charging system (not shown) measures temperature through temperature node 205 to determine when to change or switch operating modes. The battery charging system may be one designed for nickel cadmium cells, nickel metal hydride cells or the like. As indicated above, low voltage switch 210 is used to prevent rechargeable cells 211 from discharging below a selected value. Conversely, when control circuit 209 detects that rechargeable cell 212 has reached a predetermined high voltage during charging, it sends a control signal through control line 211 to high temperature simulator circuit 201 and high voltage switch 217 through delay 214. High temperature simulator circuit 201 is comprised of a diode 213 and resistor 215. When the control signal enables high temperature simulator circuit 201 and high voltage switch 217, it switches the voltage at temperature node 205 from a high level to virtual ground node 207. This has the affect of pulling or lowering the voltage on temperature node 205 to a low value since current is being sunk to virtual ground node 207. Thus, this lower voltage simulates a high temperature condition of thermistor 216. This is detected by the battery charging system on temperature node 205 as high temperature condition which enables it to switch modes. Although diode 213 could be used alone, resistor 215 is used to insure the voltage on temperature node 205 is not dropped to too low a value since certain varieties of battery chargers enter a test mode under these conditions.

Figure 3:
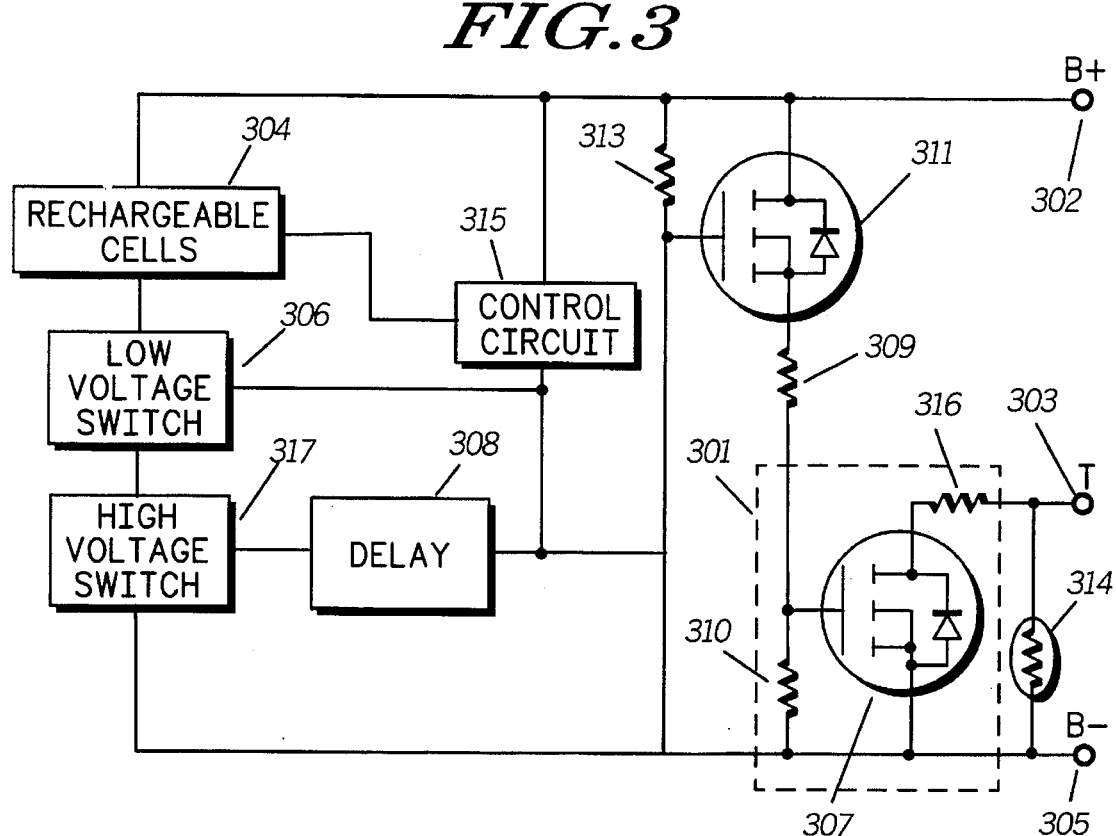
FIG. 3 is a partial schematic diagram in accordance with a preferred embodiment of the invention showing a high temperature simulator which is used when only a low current source is available.

FIG. 3 illustrates a schematic representation of the high temperature simulator circuit 301 typically used in a rechargeable battery 300 such as a lithium ion battery. High temperature simulator circuit 301 is used where control circuit 315 cannot sink a significant amount current to allow the circuit shown in FIG. 2 to be used. It should be evident to those skilled in the art the function and operation of the rechargeable cells 304, low voltage switch 306 and delay 308 are like that described in FIGS. 1 and 2 above. Rechargeable battery 300 utilizes a charging node 302, temperature node 303 and virtual ground node 305. The high temperature simulator circuit 301 is comprised of an N-channel MOSFET 307, resistor 309, resistor 310, P-channel MOSFET 311 and resistor 313. In operation, when control circuit 315 actuates high voltage switch 317, this biases the gate-source junction of P-channel MOSFET 311. Resistor 313 is used to pull up or increase the voltage on the gate of N-channel MOSFET 307 if control circuit 315 should fail. Resister 313 is of a sufficiently high resistance to allow only a negligible current flow through it from charging node 302 when a control signal is enabled from control circuit 315. This causes P-channel MOSFET 311 to become a low resistance value and current flows through P-channel MOSFET 311, resistor 309 and resistor 310. The resulting voltage produced also biases N-channel MOSFET 307 into a low resistance state switching it to an on state. Once N-channel MOSFET 307 is switched on, resistor 316 acts to drop voltage on temperature node 303 sufficiently to indicate or simulate to a battery charging system (not shown) that a high temperature condition exists. The voltage at temperature node 303 is dropped low since the current passing through this node is directed or sunk to virtual ground node 305. Thus, the voltage measured across thermistor 314 is simulated using high temperature simulator circuit 301. The configuration shown in FIG. 3 may only be used if control circuit 315 cannot handle excessive current it must sink from an attached charging system. The circuit shown in FIG. 3 is more complex however it has the advantage of low current since only a negligible amount of current flow through resistor 313 when a control signal is enabled from control circuit 315.

Figure 4:
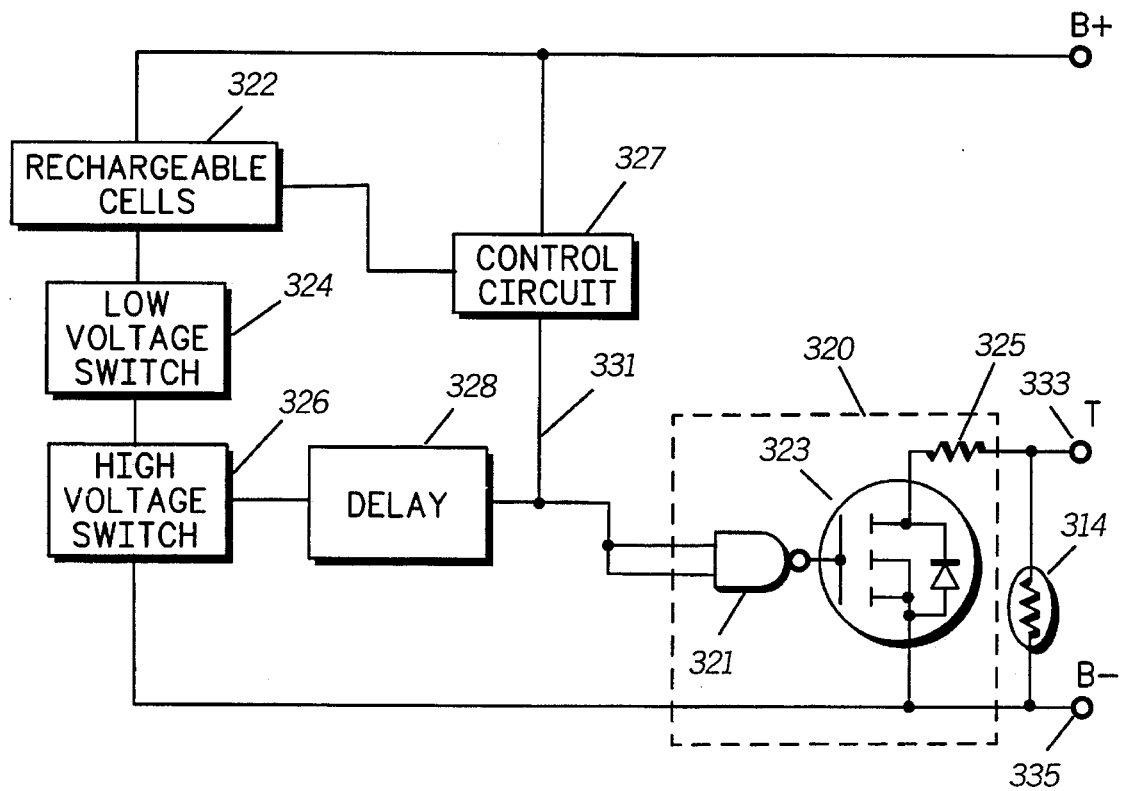
FIG. 4 is a partial schematic diagram in accordance with a preferred embodiment of the invention showing an alternative embodiment of a high temperature simulator to that shown in FIG. 2.

FIG. 4 illustrates a schematic representation of a high temperature simulator circuit 320. High temperature simulator circuit 320 is an alternative embodiment to that shown in FIG. 2 where a high current source from an attached charging system is available. It should be evident to those skilled in the art the function and operation of the rechargeable cells 322, low voltage switch 324, high voltage switch 326 and delay 328 are like that described in FIGS. 1, 2 and 3 above. In the preferred embodiment, high temperature Simulator circuit 320 includes an inverter gate 321, P-channel MOSFET 323 and resister 325. In operation, like the other embodiments above, when control circuit 327 detects a high voltage condition in cells 329, a control signal is emitted on control line 331. This pulls or lowers the voltage on control line 331 to a low state which also controls the input of inverter gate 321 low. This biases P-channel MOSFET 323 turning it on. When P-channel MOSFET is turned on this pulls or lowers the temperature node 333 to a low state since temperature node 333 is effectively connected to virtual ground node 335. The value of resister 325 is used to control and/or select the desired temperature level that is interpreted by an attached battery charging system. Thus, an attached battery charging system which is connected to temperature node 333 detects a high temperature in view of the low voltage on this node. High temperature simulator circuit 320 acts to simulate or create a false high temperature condition.

The preferred method of practicing the invention includes charging a rechargeable battery with a charging apparatus having a first mode of operation and second mode of operation whose charging scheme is incompatible with the rechargeable cell within said rechargeable battery. The steps include applying a charging current from the charging apparatus to the rechargeable cell. Detecting a voltage potential of the rechargeable cell. Measuring the temperature of the rechargeable cell using a temperature sensor and sending a control signal from a first control network to a second control network when a predetermined voltage potential is reached to allow the temperature sensor to simulate a high temperature to the charging apparatus. Finally, sensing a simulated high temperature of the charging apparatus to change from said first mode of operation to the second mode of operation allowing the rechargeable cell to charge at a slower rate.

Thus, hot battery simulator apparatus and method disclosed will enable a new generation of lithium cell chemistries to be used without the burden of the consumer having to purchase a special charger to accommodate and recharge these rechargeable cells such as lithium ion cells. This will more greatly enhance the benefits and advantages of utilizing lithium based cells keeping overall cost low as opposed to buying a completely new charger and batteries for any desired application.

While the preferred embodiments of the invention have been illustrated and described, it will be dear that the invention is not so limited. Numerous modifications, changes, variations, substitutions and equivalents will occur to those skilled in the art without departing from the spirit and scope of the present invention as defined by the appended claims.

What is claimed is:

1. A rechargeable battery system which is charged by a charging network which is not intended for use with said rechargeable battery system, said charging network having a first mode of operation and a second mode of operation, said rechargeable battery system comprising:

at least one rechargeable cell;
   at least one temperature sensor having a first state and a second state for measuring an operating temperature of said at least one rechargeable cell;
   a first control means for detecting a voltage potential of said at least one rechargeable cell:
   a second control means actuated by said first control means for changing said at least one temperature sensor from said first state to said second state; and
   whereby said second control means is actuated based on said voltage potential for simulating a high temperature condition of said at least one rechargeable cell to enable said charging network to change from said first mode of operation to said second mode of operation.

2. A rechargeable battery system as in claim 1 further comprising:

a first switch for disconnecting said at least one rechargeable cell when at a first predetermined voltage level.

3. A rechargeable battery system as in claim 2 further comprising:

a means for delaying attached to said first switch and said first control means for delay actuation of said first switch before said second control means is actuated.

4. A rechargeable battery system as in claim 3 further comprising:

a second switch for disconnecting said at least one rechargeable cell when said at least one rechargeable cell reaches a second predetermined voltage level.

5. A rechargeable battery system as in claim 4 wherein said first switch and said second switch are controlled by said first control means.

6. A rechargeable battery system as in claim 4 wherein said first switch and said second switch are serially connected with said charging network.

7. A rechargeable battery system as in claim 1 wherein said first mode of operation allows said at least one rechargeable cell to charge at a substantially fast rate.

8. A rechargeable battery system as in claim 7 wherein said second mode allows said at least one rechargeable cell to charge at a rate below said substantially fast rate.

9. A rechargeable battery system as in claim 1 wherein said at least one rechargeable cell is a lithium ion cell.

10. A rechargeable battery system as in claim 1 wherein said charging network is configured for used with nickel cadmium cells.

11. A rechargeable battery system as in claim 1 wherein said charging network is configured for use with nickel metal hydride cells.

12. A battery utilizing a lithium ion chemistry used to power electronic devices, said battery capable of being recharged by a charging system, said charging system generating a charging voltage and having a capability for receiving temperature information, said battery comprising:

at least one lithium ion cell;
   a battery control device for measuring a voltage of said at least one lithium ion cell and providing a plurality of control signals in response thereto;
   a temperature sensor for detecting temperature information of said at least one lithium ion cell and supplying said temperature information to said charging system;
   a temperature control device connected to said temperature sensor for controlling operation of said temperature sensor;

at least one switch positioned in series with said charging system and controlled by said battery control device for disconnecting said charging system from said battery when said battery reaches a predetermined voltage; and wherein said battery control device activates said temperature control device in response to said at least one lithium ion cell reaching a predetermined voltage and said temperature control device altering current flow of said temperature sensor to simulate a substantially high temperature for receipt by said charging system.

13. A battery as in claim 12 further comprising a delay device for delaying actuation of said at least one switch when said temperature control device is actuated.

14. A battery as in claim 12 wherein said predetermined voltage is a substantially high voltage as compared with the voltage of at least one lithium ion cell.

15. A battery as in claim 12 wherein said predetermined voltage is a substantially low voltage as compared with the voltage of said at least one lithium ion cell.

16. A battery as in claim 12 wherein said temperature sensor is comprised of at least one thermistor.

17. A battery as in claim 12 wherein said temperature control device is comprised of a first switch actuated by said battery control device for controlling a second switch which alters current flowing through said temperature sensor.

18. A battery as in claim 17 wherein said first switch and said second switch are MOSFET's.

19. A battery as in claim 12 wherein said temperature control device is comprised of an inverter gate for altering one of said plurality of control signals, said inverter gate used to control a switch for directing current in an alternate path around said temperature sensor to simulate a high temperature condition.

20. A method of charging a rechargeable battery with a charging apparatus having a first mode of operation and second mode of operation and whose charging scheme is incompatible with said rechargeable cell within said rechargeable battery, comprising the steps of:

applying a charging current from said charging apparatus to at least one rechargeable cell;

detecting a voltage potential of said at least one rechargeable cell;

measuring the temperature of said at least one rechargeable cell using a temperature sensor;

sending a control signal from a first control network to a second control network when a predetermined voltage potential is reached to allow said temperature sensor to simulate a high temperature to said charging apparatus; and sensing a simulated high temperature at said charging apparatus to change from said first mode of operation to said second mode of operation allowing said rechargeable cell to charge at a slower rate.

21. A method as in claim 20 wherein said charging scheme is based on a nickel metal hydride cell.

22. A method as in claim 20 wherein said charging scheme is based on a nickel cadmium cell.

23. A method as in claim 20 wherein said temperature sensor is a thermistor.

24. A method as in claim 20 further comprising the step of actuating a switching network in said second control network to lower a voltage on a temperature measurement node measured by said charging apparatus.

25. A method as in claim 20 further comprising the steps of:

charging said at least one rechargeable cell at a substantially fast rate during said first mode of operation; and charging said at least one rechargeable cell at a substantially slower rate than said first mode during said second mode of operation.

26. A method as in claim 20 further comprising the step of:

disconnecting said charging apparatus using a switch controlled by said first control network when said voltage potential of said at least one rechargeable cell reaches a predetermined level.

27. A method as in claim 26 further comprising the step of:

delaying said disconnecting step a predetermined time to allow said charging apparatus to sense said high temperature.

28. A method as in claim 20 wherein said applying step comprises the step of: charging at least one lithium ion cell.

* * * * *